United States Patent
Correia Villa Real et al.

(10) Patent No.: US 12,039,365 B2
(45) Date of Patent: Jul. 16, 2024

(54) PROGRAM CONTEXT MIGRATION

(71) Applicant: International Business Machines Corporation, Armonk, NY (US)

(72) Inventors: Lucas Correia Villa Real, Sao Paulo (BR); Marco Aurelio Stelmar Netto, Sao Paulo (BR); Renato Luiz de Freitas Cunha, Sao Paulo (BR); Renan Francisco Santos Souza, Rio de Janeiro (BR); Alan Braz, Campinas (BR)

(73) Assignee: International Business Machines Corporation, Armonk, NY (US)

( * ) Notice: Subject to any disclaimer, the term of this patent is extended or adjusted under 35 U.S.C. 154(b) by 643 days.

(21) Appl. No.: 17/216,817

(22) Filed: Mar. 30, 2021

(65) Prior Publication Data
US 2022/0318049 A1    Oct. 6, 2022

(51) Int. Cl.
G06F 9/48    (2006.01)
G06F 9/451    (2018.01)
G06F 9/46    (2006.01)

(52) U.S. Cl.
CPC ............ *G06F 9/4856* (2013.01); *G06F 9/451* (2018.02); *G06F 9/461* (2013.01)

(58) Field of Classification Search
CPC ........ G06F 9/4856; G06F 9/451; G06F 9/461; G06F 9/44542; G06F 8/76
See application file for complete search history.

(56) References Cited

U.S. PATENT DOCUMENTS

| | | |
|---|---|---|
| 8,095,929 B1 | 1/2012 | Ji et al. |
| 8,405,666 B2 | 3/2013 | Masood |
| 9,026,502 B2 | 5/2015 | Driesen et al. |
| 9,104,645 B2 | 8/2015 | Dawkins et al. |
| 9,189,261 B2 | 11/2015 | Masood |

(Continued)

FOREIGN PATENT DOCUMENTS

| | | |
|---|---|---|
| CN | 102150150 A | 8/2011 |
| CN | 106980505 A | 7/2017 |

(Continued)

OTHER PUBLICATIONS

International Search Report and Written Opinion dated Jun. 7, 2022 issued in PCT/CN2022/079552, 12 pages.

(Continued)

*Primary Examiner* — Jorge A Chu Joy-Davila
(74) *Attorney, Agent, or Firm* — Scully, Scott, Murphy & Presser, P.C.; Jared Chaney

(57) ABSTRACT

A collection of code fragments loaded in an interactive development platform for running on a first processor can be received. A candidate fragment in the collection of code fragments can be determined for migration to a second processor based on characterizing the collection of code fragments. Based on a location of the candidate fragment in the collection of code fragments, a spot can be identified in the collection of code fragments to inject a code for saving program context. The code for saving program context can be injected in the identified spot. Responsive to the code for saving program context having run on the first processor and based on a criterion, the program context can be migrated to the second processor.

25 Claims, 9 Drawing Sheets

(56) References Cited

U.S. PATENT DOCUMENTS

| | | | |
|---|---|---|---|
| 9,223,616 | B2 | 12/2015 | Tsirkin |
| 9,250,901 | B2 | 2/2016 | Sodhi et al. |
| 9,251,004 | B1 | 2/2016 | Havemose |
| 9,262,170 | B2 | 2/2016 | Krishna et al. |
| 9,507,630 | B2 | 11/2016 | Addepalli et al. |
| 9,547,542 | B1 | 1/2017 | Havemose |
| 9,588,796 | B2 | 3/2017 | Tarasuk-Levin et al. |
| 9,588,807 | B2 | 3/2017 | Alanis et al. |
| 9,830,194 | B2 | 11/2017 | Neft |
| 9,858,114 | B2 | 1/2018 | Fries et al. |
| 10,009,261 | B2 | 6/2018 | Zhang et al. |
| 10,162,559 | B2 | 12/2018 | Makin et al. |
| 10,205,677 | B2 | 2/2019 | Udupi et al. |
| 10,509,687 | B2 | 12/2019 | Jain et al. |
| 10,579,409 | B2 | 3/2020 | Beveridge et al. |
| 10,659,387 | B2 | 5/2020 | Udupi et al. |
| 10,740,146 | B2 | 8/2020 | Mohan |
| 2013/0055225 | A1* | 2/2013 | Ravi ................. G06F 8/456 717/149 |
| 2013/0086200 | A1 | 4/2013 | Alanis et al. |
| 2013/0339943 | A1 | 12/2013 | Mallya |
| 2014/0032884 | A1 | 1/2014 | Krishna et al. |
| 2014/0282375 | A1 | 9/2014 | Gulwani et al. |
| 2015/0089382 | A1 | 3/2015 | Feng et al. |
| 2016/0170849 | A1* | 6/2016 | Cheng ............... G06F 11/203 714/11 |
| 2017/0300368 | A1 | 10/2017 | Jain et al. |
| 2018/0225100 | A1* | 8/2018 | Cook ................ G06F 8/451 |
| 2020/0019652 | A1* | 1/2020 | Qian ................. G06F 30/327 |
| 2020/0097330 | A1 | 3/2020 | Netto et al. |
| 2020/0192662 | A1 | 6/2020 | Hu |
| 2021/0141675 | A1* | 5/2021 | Yang ................. G06F 9/5016 |

FOREIGN PATENT DOCUMENTS

| | | |
|---|---|---|
| CN | 108595184 A | 9/2018 |
| CN | 109344230 A | 2/2019 |
| CN | 112181489 A | 1/2021 |
| EP | 2 812 801 A1 | 12/2014 |
| EP | 3 049 955 A1 | 8/2016 |
| KR | 10-1654395 B1 | 9/2016 |
| WO | 2010/030489 A2 | 3/2010 |
| WO | 2013/119730 A1 | 8/2013 |
| WO | 2015/047659 A1 | 4/2015 |

OTHER PUBLICATIONS

Liu, H., et al., "Live Migration of Virtual Machine Based on Full System Trace and Replay", HPDC'09, Jun. 11-13, 2009, pp. 101-110.

Litzkow, M., et al., "Checkpoint and Migration of UNIX Processes in the Condor Distributed Processing System", Technical Report #1346, Apr. 1997, pp. 1-8.

Mehta, R.K., et al., "Leveraging Checkpoint/Restore to Optimize Utilization of Cloud Compute Resources", 40th Annual IEEE Conference on Local Computer Networks, LCN 2015, Oct. 26-29, 2015, pp. 714-721.

Djuric, Z., et al., "A Source Code Similarity System for Plagiarism Detection", The Computer Journal, Jan. 2013, 43 pages.

NIST, "NIST Cloud Computing Program", http://csrc.nist.gov/groups/SNS/cloud-computing/index.html, Created Dec. 1, 2016, Updated Oct. 6, 2017, 9 pages.

* cited by examiner

PROGRAM CONTEXT MIGRATION

BACKGROUND

The present application relates generally to computers and computer applications, and more particularly to program migration including identification of sweet spots for program context migration based on code pattern recognition and fragment characterization.

Program developers and data scientists, or other users may develop applications and computer models using a development technology, which can include an ordered group of cells, in which each cell has source code or markup for document rendering. Such development technology enables a form of literate programming, with source code and its output located closely together. An example of such technology is Jupyter Notebook. It may be that some parts of the code may require, or benefit from using, a specialized computing resource (e.g., accelerators such as graphical processing units (GPUs) or field programmable gate arrays (FPGAs)), or large computing machines (e.g., supercomputers) to process those parts in a feasible time.

The process of live migration may begin by stopping the process immediately before the migration begins, saving its execution context to a file, transferring that file over the network to a new host computer, restoring it at the new host, and continuing the execution from where it stopped. Depending on the state of the process, however, the size of the checkpoint can be very large and its transfer over the network can take a while to complete.

BRIEF SUMMARY

The summary of the disclosure is given to aid understanding of a computer system and method of program migration, and not with an intent to limit the disclosure or the invention. It should be understood that various aspects and features of the disclosure may advantageously be used separately in some instances, or in combination with other aspects and features of the disclosure in other instances. Accordingly, variations and modifications may be made to the computer systems their method of operation to achieve different effects.

A computer-implemented method in an aspect can include receiving a collection of code fragments loaded in an interactive development platform for running on a first processor. The method can also include determining a candidate fragment in the collection of code fragments for migration to a second processor based on characterizing the collection of code fragments. The method can also include, based on a location of the candidate fragment in the collection of code fragments, identifying a spot in the collection of code fragments to inject a code for saving program context. The method can also include injecting the code for saving program context in the identified spot. The method can also include, responsive to the code for saving program context having run on the first processor and based on a criterion, migrating the program context to the second processor.

The method in an aspect can efficiently run a program utilizing different types of computer resources efficiently based on characteristics of program fragments.

In another aspect, a computer-implemented method can include receiving a collection of code fragments loaded in an interactive development platform for running on a first processor. The method can also include determining a candidate fragment in the collection of code fragments for migration to a second processor based on characterizing the collection of code fragments. The method can also include, based on a location of the candidate fragment in the collection of code fragments, identifying a spot in the collection of code fragments to inject a code for saving program context. The method can also include injecting the code for saving program context in the identified spot. The method can also include, responsive to the code for saving program context having run on the first processor and based on a criterion, migrating the program context to the second processor. The method can also include migrating the candidate fragment to the second processor.

In yet another aspect, a computer-implemented method can include receiving a collection of code fragments loaded in an interactive development platform for running on a first processor. The method can also include determining a candidate fragment in the collection of code fragments for migration to a second processor based on characterizing the collection of code fragments. The method can also include, based on a location of the candidate fragment in the collection of code fragments, identifying a spot in the collection of code fragments to inject a code for saving program context. The method can also include injecting the code for saving program context in the identified spot. The method can also include, responsive to the code for saving program context having run on the first processor and based on a criterion, migrating the program context to the second processor. The method can also include receiving from the second processor an updated program context generated responsive to the candidate fragment running on the second processor. The method can also include continuing with running the collection of code fragments at the first processor.

In still another aspect, a computer-implemented method can include receiving a collection of code fragments loaded in an interactive development platform for running on a first processor. The method can also include determining a candidate fragment in the collection of code fragments for migration to a second processor based on characterizing the collection of code fragments. The method can also include, based on a location of the candidate fragment in the collection of code fragments, identifying a spot in the collection of code fragments to inject a code for saving program context. The method can also include injecting the code for saving program context in the identified spot. The method can also include, responsive to the code for saving program context having run on the first processor and based on a criterion, migrating the program context to the second processor. The interactive development platform can include an interactive computing notebook.

In still yet another aspect, a computer-implemented method can include receiving a collection of code fragments loaded in an interactive development platform for running on a first processor. The method can also include determining a candidate fragment in the collection of code fragments for migration to a second processor based on characterizing the collection of code fragments. The method can also include, based on a location of the candidate fragment in the collection of code fragments, identifying a spot in the collection of code fragments to inject a code for saving program context. The method can also include injecting the code for saving program context in the identified spot. The method can also include, responsive to the code for saving program context having run on the first processor and based on a criterion, migrating the program context to the second processor. Characterizing the collection of code fragments can include determining computational intensiveness of each fragment in the collection of code fragments.

In another aspect, a computer-implemented method can include receiving a collection of code fragments loaded in an interactive development platform for running on a first processor. The method can also include determining a candidate fragment in the collection of code fragments for migration to a second processor based on characterizing the collection of code fragments. The method can also include, based on a location of the candidate fragment in the collection of code fragments, identifying a spot in the collection of code fragments to inject a code for saving program context. The method can also include injecting the code for saving program context in the identified spot. The method can also include, responsive to the code for saving program context having run on the first processor and based on a criterion, migrating the program context to the second processor. Characterizing the collection of code fragments can include determining computational intensiveness of each fragment in the collection of code fragments. The computational intensiveness can be determined based on using previously known computational intensive code fragments.

In another aspect, a computer-implemented method can include receiving a collection of code fragments loaded in an interactive development platform for running on a first processor. The method can also include determining a candidate fragment in the collection of code fragments for migration to a second processor based on characterizing the collection of code fragments. The method can also include, based on a location of the candidate fragment in the collection of code fragments, identifying a spot in the collection of code fragments to inject a code for saving program context. The method can also include injecting the code for saving program context in the identified spot. The method can also include, responsive to the code for saving program context having run on the first processor and based on a criterion, migrating the program context to the second processor. Characterizing the collection of code fragments can include determining computational intensiveness of each fragment in the collection of code fragments. The computational intensiveness can be determined based on using previously known computational intensive code fragments. The computational intensiveness can be determined based on training a machine learning model to predict a fragment's computational intensiveness based on the previously known computational intensive code fragments.

In yet another aspect, a computer-implemented method can include receiving a collection of code fragments loaded in an interactive development platform for running on a first processor. The method can also include determining a candidate fragment in the collection of code fragments for migration to a second processor based on characterizing the collection of code fragments. The method can also include, based on a location of the candidate fragment in the collection of code fragments, identifying a spot in the collection of code fragments to inject a code for saving program context. The method can also include injecting the code for saving program context in the identified spot. The method can also include, responsive to the code for saving program context having run on the first processor and based on a criterion, migrating the program context to the second processor. Characterizing the collection of code fragments can include determining computational intensiveness of each fragment in the collection of code fragments. The computational intensiveness can be determined based on running time of a code fragment and interactive pattern associated with the code fragment.

In another aspect, a computer-implemented method can include receiving a collection of code fragments loaded in an interactive development platform for running on a first processor. The method can also include determining a candidate fragment in the collection of code fragments for migration to a second processor based on characterizing the collection of code fragments. The method can also include, based on a location of the candidate fragment in the collection of code fragments, identifying a spot in the collection of code fragments to inject a code for saving program context. The method can also include injecting the code for saving program context in the identified spot. The method can also include, responsive to the code for saving program context having run on the first processor and based on a criterion, migrating the program context to the second processor. The method can also include adding an interactive graphical element to a user interface window of the interactive development platform showing the candidate fragment, the interactive graphical element providing an option to a user to migrate the candidate fragment for running on the second processor.

In another aspect, a computer-implemented method can include receiving a collection of code fragments loaded in an interactive development platform for running on a first processor. The method can also include determining a candidate fragment in the collection of code fragments for migration to a second processor based on characterizing the collection of code fragments. The method can also include, based on a location of the candidate fragment in the collection of code fragments, identifying a spot in the collection of code fragments to inject a code for saving program context. The method can also include injecting the code for saving program context in the identified spot. The method can also include, responsive to the code for saving program context having run on the first processor and based on a criterion, migrating the program context to the second processor. The criterion can include a size of the program context meeting a threshold value.

In another aspect, a computer-implemented method can include receiving a collection of code fragments loaded in an interactive development platform for running on a first processor. The method can also include determining a candidate fragment in the collection of code fragments for migration to a second processor based on characterizing the collection of code fragments. The method can also include, based on a location of the candidate fragment in the collection of code fragments, identifying a spot in the collection of code fragments to inject a code for saving program context. The method can also include injecting the code for saving program context in the identified spot. The method can also include, responsive to the code for saving program context having run on the first processor and based on a criterion, migrating the program context to the second processor. The second processor has more computational power than the first processor.

In another aspect, a computer-implemented method can include receiving code fragments loaded in an interactive development platform for running on a first processor. The method can also include determining a candidate fragment from the code fragments for migration to a second processor based on determining computational intensiveness associated with each of the code fragments. The method can also include identifying a spot in the code fragments for saving program context. The method can also include injecting in the identified spot computer instructions for saving program context. The method can also include, responsive to the computer instructions for saving program context having run on the first processor, determining whether migrating the program context or migrating code fragment that produced the program context is more cost effective. The method can also include, responsive to determining that migrating the program context is more cost effective, migrating the program context to the second processor. The method can also include, responsive to determining that migrating the code fragment that produced the program context is more cost effective, migrating the code fragment that produced the program context to the second processor.

In another aspect, a computer-implemented method can include receiving code fragments loaded in an interactive development platform for running on a first processor. The method can also include determining a candidate fragment from the code fragments for migration to a second processor based on determining computational intensiveness associated with each of the code fragments. The method can also include identifying a spot in the code fragments for saving program context. The method can also include injecting in the identified spot computer instructions for saving program context. The method can also include, responsive to the computer instructions for saving program context having run on the first processor, determining whether migrating the program context or migrating code fragment that produced the program context is more cost effective. The method can also include, responsive to determining that migrating the program context is more cost effective, migrating the program context to the second processor. The method can also include, responsive to determining that migrating the code fragment that produced the program context is more cost effective, migrating the code fragment that produced the program context to the second processor. Whether migrating the program context or migrating code fragment that produced the program context is more cost effective can be determined based on the size of the program context and the processing time for running the code fragment that produced the program context.

In another aspect, a computer-implemented method can include receiving code fragments loaded in an interactive development platform for running on a first processor. The method can also include determining a candidate fragment from the code fragments for migration to a second processor based on determining computational intensiveness associated with each of the code fragments. The method can also include identifying a spot in the code fragments for saving program context. The method can also include injecting in the identified spot computer instructions for saving program context. The method can also include, responsive to the computer instructions for saving program context having run on the first processor, determining whether migrating the program context or migrating code fragment that produced the program context is more cost effective. The method can also include, responsive to determining that migrating the program context is more cost effective, migrating the program context to the second processor. The method can also include, responsive to determining that migrating the code fragment that produced the program context is more cost effective, migrating the code fragment that produced the program context to the second processor. A plurality of spots for saving program contexts in a plurality of code fragments can be identified, and the method can further include choosing which checkpoints created at which of the plurality of spots are to be migrated based on program context sizes of the checkpoints and processing times of the code fragments that created the checkpoints.

In another aspect, a computer-implemented method can include receiving code fragments loaded in an interactive development platform for running on a first processor. The method can also include determining a candidate fragment from the code fragments for migration to a second processor based on determining computational intensiveness associated with each of the code fragments. The method can also include identifying a spot in the code fragments for saving program context. The method can also include injecting in the identified spot computer instructions for saving program context. The method can also include, responsive to the computer instructions for saving program context having run on the first processor, determining whether migrating the program context or migrating code fragment that produced the program context is more cost effective. The method can also include, responsive to determining that migrating the program context is more cost effective, migrating the program context to the second processor. The method can also include, responsive to determining that migrating the code fragment that produced the program context is more cost effective, migrating the code fragment that produced the program context to the second processor. The method can also include waiting for second processor to run the candidate fragment and receiving an updated program context associated with running of the candidate fragment.

In another aspect, a computer-implemented method can include receiving code fragments loaded in an interactive development platform for running on a first processor. The method can also include determining a candidate fragment from the code fragments for migration to a second processor based on determining computational intensiveness associated with each of the code fragments. The method can also include identifying a spot in the code fragments for saving program context. The method can also include injecting in the identified spot computer instructions for saving program context. The method can also include, responsive to the computer instructions for saving program context having run on the first processor, determining whether migrating the program context or migrating code fragment that produced the program context is more cost effective. The method can also include, responsive to determining that migrating the program context is more cost effective, migrating the program context to the second processor. The method can also include, responsive to determining that migrating the code fragment that produced the program context is more cost effective, migrating the code fragment that produced the program context to the second processor. The computational intensiveness can be determined based on running time of a code fragment and interactive pattern associated with the code fragment.

A system including at least a hardware processor configured to perform one or more methods described herein can be provided. A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
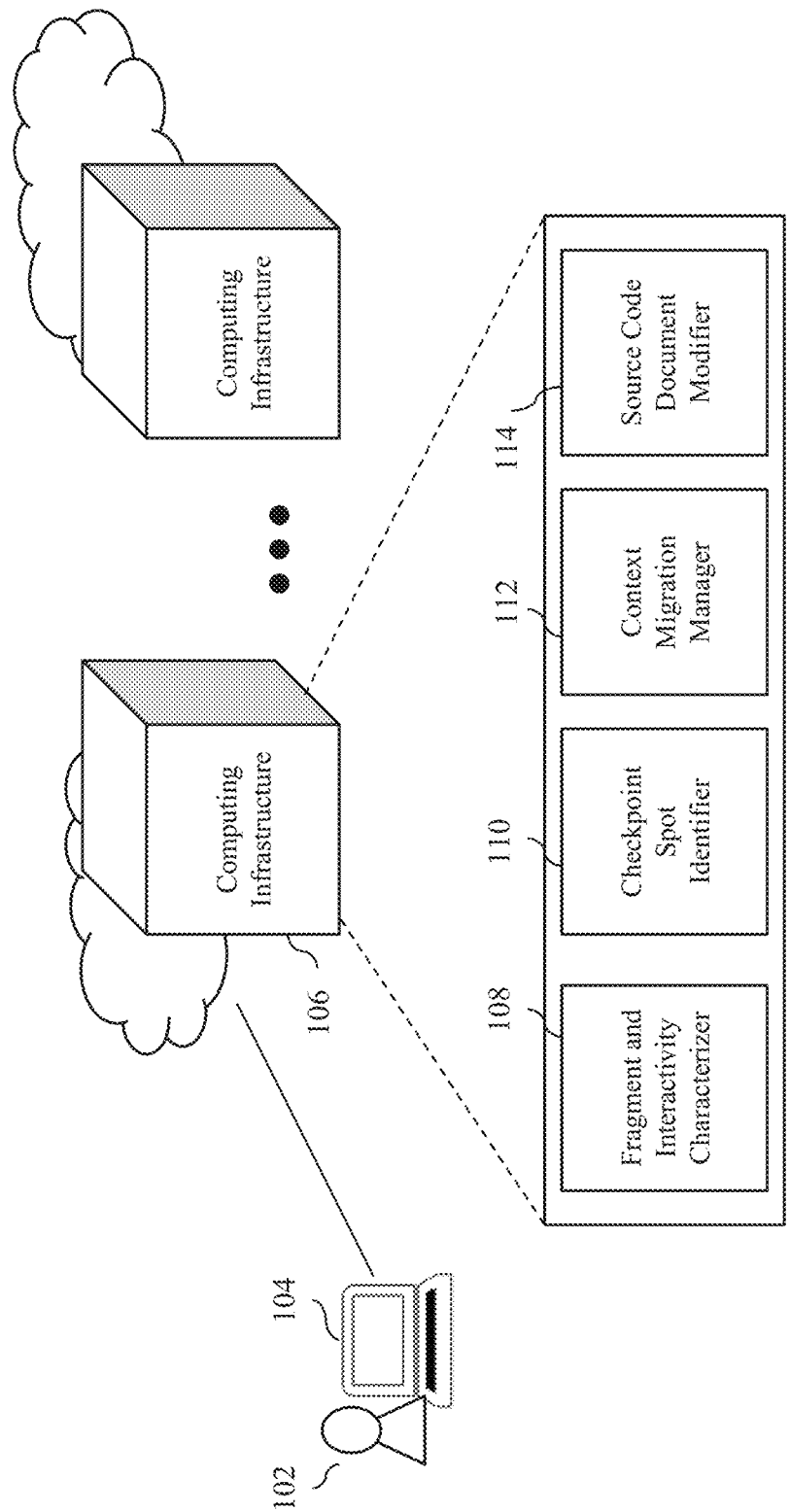
FIG. 1 is a diagram illustrating components of a system for program migration in an embodiment.

The transference of a context of the program execution to different computing environment is called migration, which uses a step of checkpointing to save the context. Checkpointing is an act of dumping the context of a program to a file so that its execution can stop and resume at a later point. Checkpointing is used in the live migration of programs to a different machine, for example, so that core routines can execute on computers with more processing power or specialized resources. The process of live migration may begin by stopping the process immediately before the migration begins, saving its execution context to a file, transferring that file over the network to a new host computer, restoring it at the new host, and continuing the execution from where it stopped. Depending on the state of the process, however, the size of the checkpoint can be very large and its transfer over the network can take a while to complete.

In one or more embodiments, systems and methods can be provided for program migration. In an aspect, a system and method can address a problem in code migration, e.g., by identifying code fragments to be migrated to different computing environments, and migrating those code fragments, in a cost-efficient manner.

A system, for example, can include computer-implemented components, for instance, implemented and/or run on one or more hardware processors, or coupled with one or more hardware processors. One or more hardware processors, for example, may include components such as programmable logic devices, microcontrollers, memory devices, and/or other hardware components, which may be configured to perform respective tasks described in the present disclosure. Coupled memory devices may be configured to selectively store instructions executable by one or more hardware processors. A processor may be a central processing unit (CPU), a graphics processing unit (GPU), a field programmable gate array (FPGA), an application specific integrated circuit (ASIC), another suitable processing component or device, or one or more combinations thereof. The processor may be coupled with a memory device. The memory device may include random access memory (RAM), read-only memory (ROM) or another memory device, and may store data and/or processor instructions for implementing various functionalities associated with the methods and/or systems described herein. The processor may execute computer instructions stored in the memory or received from another computer device or medium. A method, for example, can include a computer-implemented method, for example, implemented or run on one or more processors.

In an embodiment, a system and/or a method can identify one or more parts of a code or program, in which checkpoints may be saved in order to allow the program context migration to another computing environment. For instance, a system may identify one or more parts of a code in an interactive computing notebooks or documents. Examples of such interactive computing notebooks can include, but are not limited to, Jupyter Notebook and Wolfram Notebook. By way of example, interactive computing notebooks or like is a mix of code, execution of models, graphs, extra documentation, e.g., text, code and results, which can facilitate communication and collaboration, and which can be used to develop programs, for example, data-driven models. These documents are usually run on user machines or remote servers. In addition, fragments of cells of documents can also be run in multiple platforms or machines. The system and/or method in an embodiment can identify fragments to be migrated and allow migration in a cost-effective manner, for example, identify sweet spots for program context migration (e.g., to be run in specialized resources) based on code pattern recognition and fragment characterization.

In an embodiment, responsive to receiving a request to migrate the computer process to a remote host, the system and/or method can identify one or more checkpoints to migrate. In an embodiment, the system and/or method may consider the following aspects to identify which one or more checkpoints to migrate: (1) the estimate of how long it will take to transfer that checkpoint file to the remote host or another processor or machine (e.g., which can be a function of the checkpoint file size and the network bandwidth available); (2) the expected consumption of system resources to replay the execution from checkpoint M to the last checkpoint N; (3) source code pattern recognition to identify parts of code (e.g., functions) that are computationally expensive; (4) analysis of user interactivity with each fragment; (5) the computational cost of migrating a program context and re-executing part of the program.

In an embodiment, the system and/or method can also transform the source code document to show or present data on migration costs to allow users understand and approve the program context migration. The system and method can provide the benefit or advantage of reducing the amount of time and resource consumption of computer tasks running on one or more processors, for example, which can be executed in multiple environments (e.g., specialized resources with GPUs and standard environment with CPUs).

FIG. 1 is a diagram illustrating components of a system for program context migration in an embodiment. A user 102 can be a developer or another user who can interact with a user device 104 in developing a code or program, for example, using an interactive computing notebook or another programming tool. A user device 104, for example, can be any computing device, with which the user 102 can interact, for example, a laptop, desktop, a mobile device such as a smartphone, a tablet, and/or another device. A computing infrastructure 106 can include a group of computing resources, which can host functionalities described herein, for example, which can provide a solution for program migration and run the user program. For example, one or loaded portions of a program may run on one computing infrastructure 106 and one or more other portions of the program may be migrated to another computing infrastructure for more efficiently running the entire program. The solution or the methodology for program context migration, and the user program can be executed on the same or different computing infrastructure. The computing infrastructure 106 can be a cloud environment and/or a super computer. In an embodiment, the computing infrastructure 106 can also include the user device 104. For example, the user program can run on the user device 104 and/or the computing infrastructure 106.

Functionalities or modules for identification of sweet spots for program context migration, for example, for interactive computing notebooks or another programming tool, can include a fragment and interactivity characterizer 108, a checkpoint spot identifier 110, a context migration manager 112 and a source code document modifier 114. The fragment and interactivity characterizer 108 can be responsible for understanding code patterns and levels of interactivity of fragments. The checkpoint spot identifier 110 can be responsible for understanding the right spot to save the checkpoint to prepare for program context migration. The context migration manager 112 can be responsible for migrating the context to a different computing infrastructure (or similar one but with on different computing resources). The source code document modifier 114 can be responsible for modifying the user source code document, for instance, so the user can have awareness and approve the context migration to a different environment.

The system can identify spots for program migration to be executed in another computer such as specialized resources, based on code pattern recognition and fragment characterization in code documents, for example, in an interactive computing notebook. The system can recognize a source code pattern to identify one or more parts of code (e.g., functions), which are candidates for migration, for example, parts which are computationally expensive or have frequent interactivity. For example, the system may utilize techniques such as abstract syntax trees, deep learning, and machine learning such as K-Nearest Neighbors, kernel regression, linear regression, and/or other techniques, to identify candidate fragments of code for migration to a specialized resource. In an embodiment, normalized code execution time from existing code documents can be used as a feature for training a machine learning model, which can classify or identify a candidate fragment. The system may also analyze the user interactivity with each fragment, the computational cost of migrating a program context and re-executing part of the program. The system may also transform the source code document with informational data or metadata associated with migration costs, as to allow a user with an option to select to perform migration or program context migration.

Figure 2:
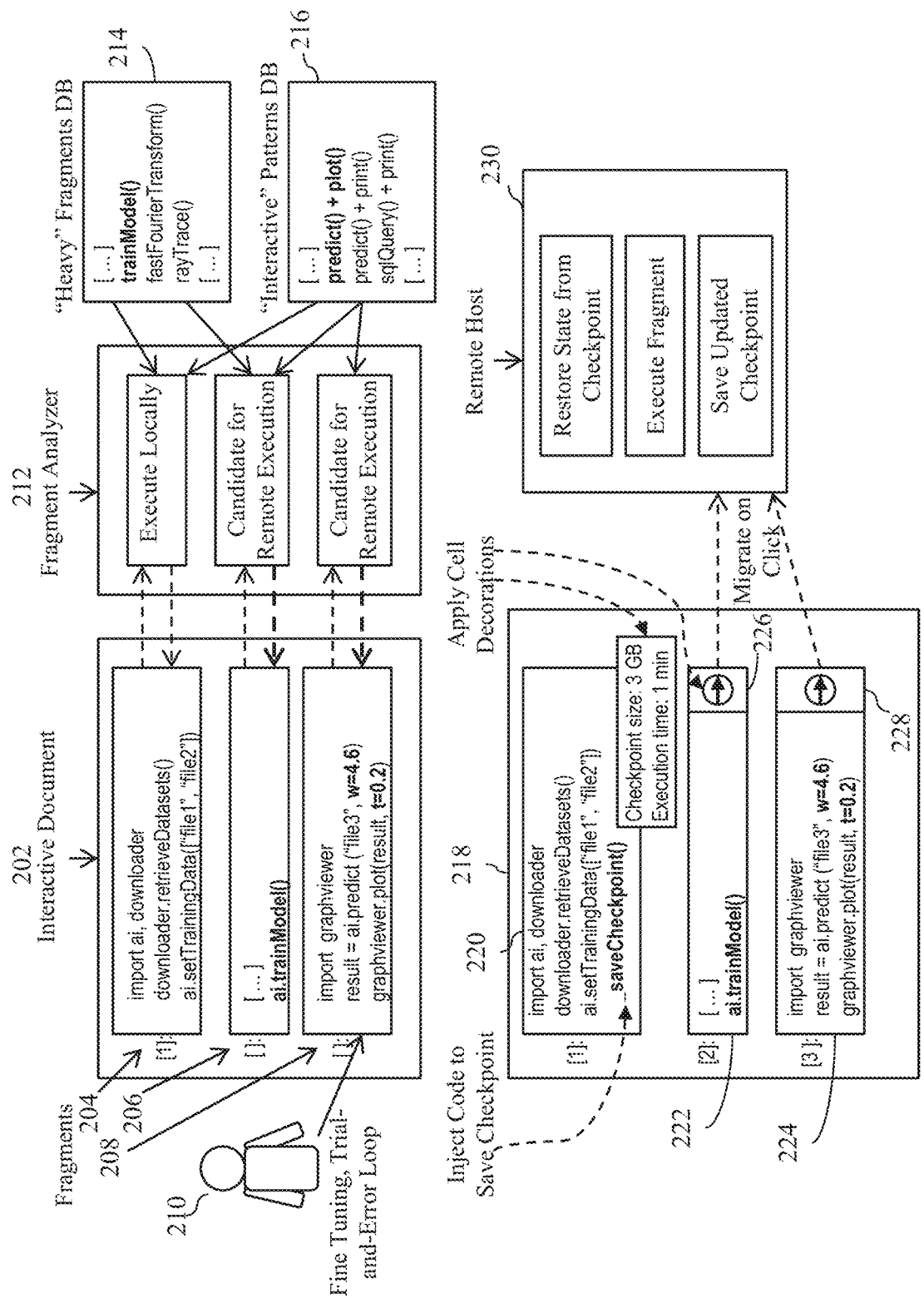
FIG. 2 is a diagram illustrating an overview of program migration in an embodiment.

FIG. 2 is a diagram illustrating an overview of program migration in an embodiment. The components shown can be implemented on, performed by and/or run by one or more computer processors, e.g., hardware processors. The figure illustrates identification of spots for program context migration, for executing portions of a program, for example, in specialized resources, based on code pattern recognition and fragment characterization for interactive computing, for example, in interactive code development environment or platform. An interactive document or programming environment 202 can include fragments or cells 204, 206, 208, which include lines of code. The interactive document 202 may be running on a computer or machine, and the fragments can be loaded to run on a processor (e.g., referred to as a first processor). A user 210 may load lines of code as fragments or cells in an interactive computing notebook or like platform, for example, via an interface or user interface (e.g., of that development platform) on a computer device. A fragment analyzer 212 or a computer processor analyzes the contents of the loaded fragments 204, 206, 208, to determine one or more candidate fragments for migration. For instance, the component shown at 108 in FIG. 1 can perform functions of the fragment analyzer 212.

In an embodiment, to select a candidate fragment, the fragment analyzer 212 may consider the computational intensity of the fragment, user interactivity with the fragment, and/or others. For example, certain codes may involve more computation, which may require more computing power to run within a feasible or desired amount of time. Other fragments may involve more interactivity with a user, for example, repetition or a loop, which may benefit from running on a machine with more power or resources than the current machine (e.g., the first processor).

The fragments shown at 204, 206, 208 illustrate an example of loaded fragments in a program loaded, for example, on an interactive development platform, e.g., interactive computing notebook. The fragment analyzer 212 analyzes the fragment at 204. This example fragment includes lines of code that load data or prepare data for processing. The fragment analyzer 212 determines that such data loading or data preparation processing would not need a more powerful or specialized machine to run, and decides or recommends that the fragment at 204 can be run locally on the current machine (e.g., the first processor), for example, on a CPU. The fragment analyzer 212 also analyzes the fragment at 206. This example fragment includes a line of code that performs machine learning model training. The fragment analyzer 212 determines that machine learning model training, for example, training an artificial neural network (e.g., which can include, but is not limited to, matrix and/or vector operations and updating of weights, for example, using learning methods such as gradient descent), can be computationally intensive and expensive, which can benefit from running on a machine with more power and/or resources, for example, a specialized processor such as a GPU or FPGA, a supercomputer, or another machine, and decides that the fragment at 206 can be a candidate for remote (or another machine) execution. The fragment analyzer 212 may tag the fragment as a candidate. The fragment analyzer 212 further analyzes the fragment at 208. This example fragment includes running the trained machine learning model, for example, to make predictions and also plotting the results. Such fragment can involve repetition, for example, fine tuning in a trial-and-error loop. The fragment analyzer 212 determines that such code would benefit from running on a machine with more computing power and/or resource, for example, a specialized processor such as a GPU or FPGA, a supercomputer, or another machine. The fragment analyzer 212 may tag the fragment as a candidate.

In an embodiment, the fragment analyzer 212 determines or selects candidate fragments for migration to another machine based on or using existing codes, for example, stored in a database or another data store. For instance, the database may store existing codes with identifiers or tags identifying or tagging them as computationally expensive or intensive, as having interactive patterns, and the like. For example, a database 214 may store code or lines of code determined to be or known to be computationally expensive, such as code that is for training a model, performing a fast Fourier Transform, ray tracing, and/or others. A database 216 may store code or lines of code determined to have or known to have interactive patterns, such as code that runs a prediction model followed by plotting or printing, and/or others. The fragment analyzer 212 may look for codes having similar characteristics as the current ones being analyzed, e.g., 204, 206, 208, in the databases 214, 216, and based on the similarity identify that a fragment is a candidate for migration. Whether a code is similar to another can be determined based on a similarity threshold. Determining similarity can also include comparing metadata or attributes associated with the lines of codes in the current fragment against or with those of the stored existing codes in a database.

In another embodiment, a machine learning model can be trained to predict whether a fragment contains code, which can be a candidate for migration. For example, attributes of existing codes (e.g., which can be stored in database 214), which are determined to be computationally expensive can be used as features in training a neural network model, a deep learning model, and/or another machine learning model to predict or classify whether a given code would be computationally expensive. For example, attributes of the current code (or given code) can be input as features in running such trained machine learning model for the trained machine learning model to predict or classify whether the given code is computationally expensive. Similarly, attributes of existing codes (e.g., which can be stored in database 216), which are determined to have interactive patterns can be used as features in training a neural network model, a deep learning model, and/or another machine learning model to predict or classify whether a given code contains an interactive pattern. For example, attributes of the current code (or given code) can be input as features in running such trained machine learning model for the trained machine learning model to predict whether the given code has interactive patterns. Other known or will be known techniques can be utilized to determine whether a particular code fragment contains computationally expensive code and/or have interactive patterns.

Based on identifying candidate fragment or fragments, one or more locations to inject code to save checkpoint can be determined, which location, for example, can be immediately before the candidate fragment that is to be migrated. By way of example, the checkpoint spot identifier shown at 110 in FIG. 1 may perform this function. Checkpointing saves program execution context to a file, so that the file may be transferred with a migrated fragment for that migrated fragment to continue to run on the migrated-to-machine.

A processor may automatically modify one or more fragments of the loaded program. For example, the source code document modifier shown at 114 in FIG. 2 may perform this function. For instance, one or more fragments or cells of the interactive document shown at 202 can be modified as shown at 218 and 220, 222 and 224. A processor, for example, injects code to save checkpoint in a fragment 220 that is run immediately prior to the candidate fragment 222, to save the context of the program up to the point before running the migrated component.

A processor may further modify the fragment 220, for example, inject code to show information such as the size of the checkpoint, the execution time for that fragment, and/or other information, which can be informative to the user in deciding or approving whether to migrate or which fragment to migrate. The candidate fragments 222, 224 can also be modified to show a user interface icon or like graphical element 226, 228, which can be activated. Activating the graphical element (e.g., pressing or clicking on a graphical icon or button) migrates the fragment to another processor or machine, for example, a remote host 230, or another local machine (e.g., referred to as a second processor). The context migration manager shown at 112 in FIG. 1 may perform the function of migration from the first processor to the second processor. The remote host 230, for example, can be a supercomputer or another computer having more processing power or resources than the machine on which the fragments were originally loaded. The remote host 230 restores the program context, e.g., from the checkpoint, executes the migrated fragment. The checkpoint can be updated based on running the migrated fragment. The remote host 230 can save the updated checkpoint. The updated checkpoint can be returned to the local machine, for instance, so that any subsequent fragments can continue to run using the updated checkpoint on the local machine. In another aspect, the migration need not be to a remote machine. For instance, the fragments can be migrated, for example, from a CPU, to a special processor such as a GPU or FPGA on a local machine.

Figure 3:
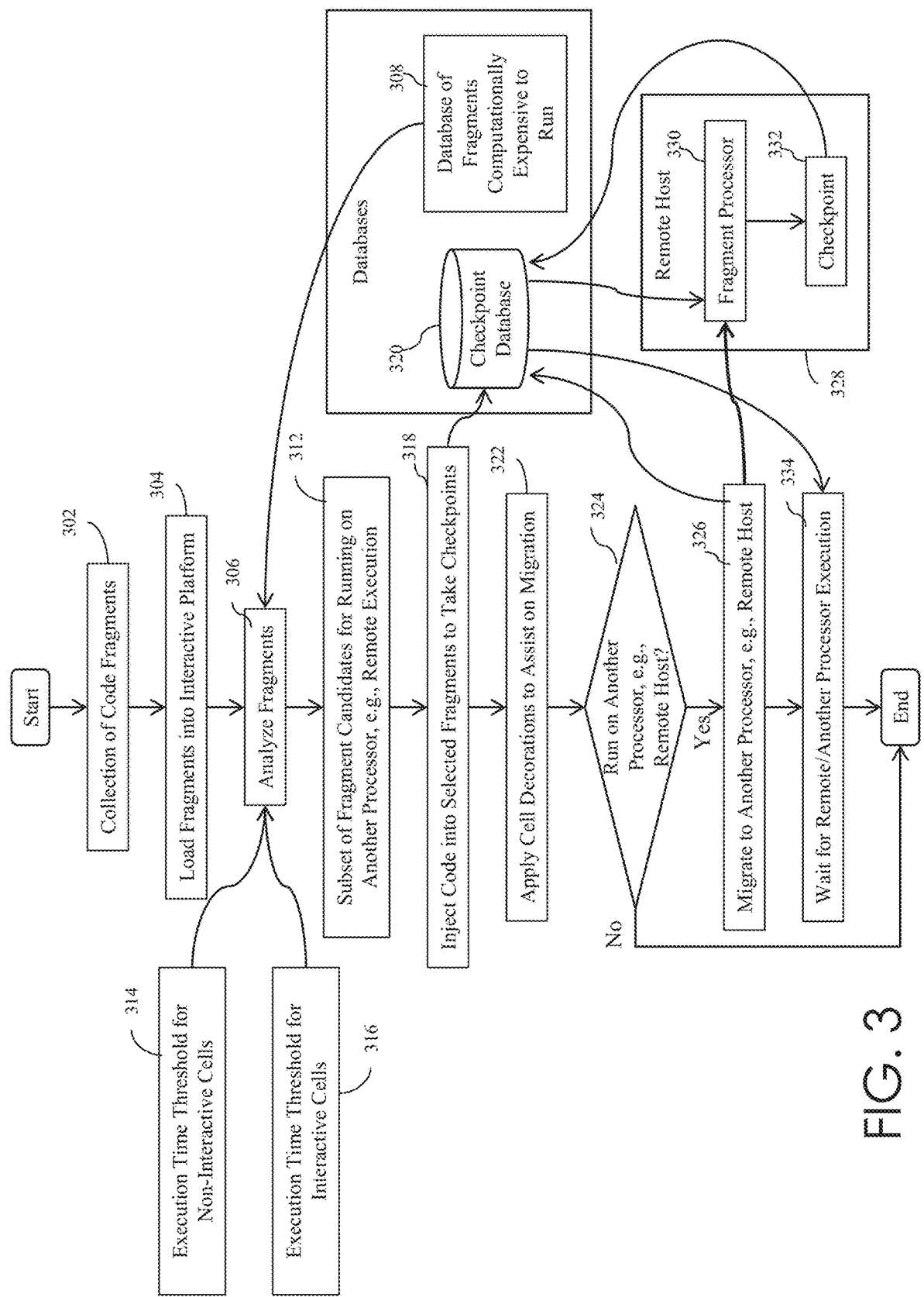
FIG. 3 is a diagram illustrating a method of program migration in an embodiment.

FIG. 3 is a diagram illustrating a method of program migration in an embodiment. At 304, a collection of code fragments 302 are loaded into an interactive development platform. For example, a user may load a collection of code fragments into an interactive computing notebook such as Jupyter Notebook. In an aspect, the code fragments may be featured as a single contiguous block of code (represented by a single execution cell) or split into smaller parts (cells) according to some criteria, which can be established by the user.

In an embodiment, at 306, prior to the execution or running of any cell, a code analyzer or a fragment analyzer or a computer processor inspects the contents of the cells, e.g., loaded into the platform, against a database of code fragments known to be computationally intensive 308. Cells that have code fragments similar to those featured in the database 308 can be considered as candidates for migration for execution on a remote host 328 with more processing power or another specialized resource, such as FPGAs or GPUs or another processor or device. At 312, the fragment analyzer or a computer processor identifies one or more candidate fragments for migration. The fragment analyzer at 306 may utilize any known or will be known method to determine or compute the similarity between the code fragments, which may include, but not limited to, comparison of attributes or metadata, comparison of bitmap, and/or others. Similarity can be determined based on the degree of similarity meeting a similarity threshold.

In an embodiment, the database 308 contains historical or existing code fragments. For example, the database 308 can be populated by scanning public repositories of interactive notebooks or like development platforms, and searching for information such as: (1) metadata that indicate how long each cell took to execute and (2) metadata that tell how many times a given cell was executed by the user. The metadata that indicate how long each cell took to execute can be used to identify patterns of code fragments that take longer than a given threshold (e.g., shown at 314) to run. The metadata that tell how many times a given cell was executed by the user can indicate patterns of code fragments that are frequently run on a "tune parameters and run again" kind of loop and whose execution time exceed another threshold (e.g., shown at 316). This component assesses the user interactivity with those fragments.

In an embodiment, the method may leverage external sources for fragment analysis, for example, at 306. For instance, existing documents can be retrieved. The user document can be compared against the existing documents for similarity using, for example, one or more techniques such as abstract syntax trees (AST) and deep learning. Based on similarity index and threshold of similarity, e.g., which can be adjusted based on dataset size and resource availability, closer or similar candidates can be selected. In an embodiment, the times of the fragments of the user document can be estimated by using the (i) features of the AST as features of a training model; (ii) execution time of the existing fragments of the candidates as labels for a regression (e.g., neural net, kernel regression, and/or others). The method may incorporate multiplication factor or weight of the user document fragments based on detected interactivity of the user with the document.

At 318, once a fragment candidate for migration has been identified, a computer processor injects code into one or more cells so that checkpoints are taken right before the candidate fragment executes or runs. Checkpointing involves capturing the state of the process, such as local variables and their values, and saving that state (also referred to as program context). For instance the state can be saved into a checkpoint database 320. In an embodiment, the code for migration can be prepared as follows. From the database 320, the computer processor may retrieve the code to be injected, e.g., code to commit the state into a checkpoint database 320 and code to execute the fragment migration. The database 320 may also include the remote host address or address of another processor where the fragment should execute. This address can also be retrieved. The database 320 may further contain a specification or instruction of how the code should be injected, e.g., before or after the original code or replacing the original piece of code by a particular modification. Such specification or instruction can also be retrieved. The code injection can be performed according to the retrieved information.

At 322, a computer processor or a migration manager decorates the cell of each fragment candidate for migration. Such decoration may include, but is not limited to, (1) the size of the checkpoint to be transferred to the remote host or another processor, (2) an estimate of the time to transfer the checkpoint to the remote host, (3) an estimate of the time to run that code fragment on the remote host or another processor, and (4) an estimate of how much time will be saved by running that fragment on the remote host versus running it locally. The decoration may also include interactive graphical elements or icons (e.g., buttons) with which the user may interactively control whether the migration is allowed or not, for instance, since there may be costs associated with data transfer and the use of remote resources.

In an embodiment, a program with several candidates for migration can have many points where checkpoints are to be taken. In an aspect, the very first checkpoints may likely be smaller in size than the last ones, since there is a tendency that a program will generate more data in memory as it runs. In an embodiment, in applying cell decorations at 322, a particular decision taken by the computer processor or a migration manager functionality is to choose which of the last N checkpoints to migrate to the remote host (or another processor) in case the user chooses to run a fragment elsewhere. In an embodiment, that decision is taken based on the size of each checkpoint versus the time it took to execute the remaining cells (up to the current cell holding the fragment to be migrated). It could be the case that it is faster to upload a checkpoint from cell N-2 and recompute cell N-1 on the remote host than to upload a much larger checkpoint at N-1, for instance. For instance, in this case, cell N-1 can also be migrated and rerun at the remote host for running cell N at the remote host.

At 324, it is determined whether the candidate fragment is to be migrated and executed on another processor, e.g., a remote host. For example, a user may activate a decoration (e.g., graphical element) associated with the candidate fragment to indicate that the candidate fragment should be run on another processor or remote host. At 326, responsive to determining that the candidate fragment is to be run on another processor or remote host, the candidate fragment is migrated to another processor or remote host 328. Based on one or more criteria, for example, whether it is cost effective to transfer saved checkpoint, the saved checkpoint may also be migrated. If, at 324, it is determined that the candidate fragment is not to be run on another processor or remote host, the method may return or end.

At 326, a live migration component or like functionality running on a computer processor performs migration to another processor, for example, a remote host 328. For instance, the computer processor running the live migration functionality pauses the execution of the program (that is loaded into the interactive platform) and migrates the selected checkpoint from database 320 and the candidate fragment to the remote host 328. The remote host 328 loads the candidate fragment and the checkpoint data, e.g., into its fragment processor 330, and executes from that checkpoint until the last line of the code in the candidate fragment migrated to that machine.

Once the candidate fragment has completed running on the remote host 328, a checkpoint 332 captured at the remote host 328 can be transferred into the checkpoint database 320. For example, the candidate fragment may also have been injected with code to save checkpoint. In an embodiment, a signal can be sent to the original machine that originated the migration. For example, at 334, the computer processor of that original machine loads that checkpoint into its interactive computational engine and resumes executing the program. In an embodiment, incremental differences between checkpoints can be stored or save on database 320, for example, rather than storing full dumps at each checkpoint. This way, there can be savings in transfer bandwidth and memory space. Known or will be known techniques can be utilized for saving checkpoints and/or different methods of storing checkpoints.

In an embodiment, the methodology disclosed herein can be implemented as an add-on, hook or service added to an interactive platform such as interactive computing notebook. In an embodiment, an interactive platform can be accessed via a browser, for example, a World Wide Web (Web) browser over a network such as the Internet. The following describes a use case by way of example. An interactive computing notebook may have several processing machines available for running a computer process or program. By way of example, consider that there are a CPU and a GPU as available resources to the interactive computing notebook to run the program. A user may load fragments or cells of a program to the interactive computing notebook. Consider that all fragments are loaded to run on the CPU initially. The methodology disclosed herein can analyze the fragments and determine which fragments would benefit from running on the GPU, for example, migrating to GPU from the CPU to run. For instance, the methodology can determine the suitable computing environment (e.g., CPU or GPU in this example) for a particular fragment or cell, based on context-awareness. The methodology can then perform context migration of code fragments to the suitable environment and seamlessly dispatch the computation on it.

In the example use case, a user, for example, may begin writing or developing a code using the interactive computing notebook, for example, as one or more fragments or cells. The cells are not run yet and the resources may be idle. The first cell begins execution and a processor, for example, the CPU, is used, for instance, because the methodology has determined that the CPU is the suitable resource to run this cell. The first cell finishes execution. The methodology may send to the user an explanation why CPU was used in this cell. For example, the methodology may present to the user that this cell has data preparation code and among the available resources, CPU is suitable for running this type of a task. The methodology, based on its determination that the next cell is suitable to run on another more powerful resource (e.g., that next cell contains code to train a machine learning model), may seamlessly perform live context migration of the user's session from CPU to other computing resource available, e.g., GPU. The user is about to execute the next cell. At this stage, the GPU is idle. At this stage, a kernel running on a machine associated with the GPU already has the user's session previously executed on the CPU, for example, due to the seamless live context migration of the code fragment. The user executes the next cell. The next cell, for example, training of the machine learning model, finishes. The methodology may present an explanation of where this cell was executed or run and why. For instance, data such as execution time on GPU, an explanation that the cell contained code for machine learning or training can be provided to the user, e.g., via a user interface of the interactive computing notebook. While the above example use case is described with reference to a CPU and GPU as an example of the source and target machines or processors in code migration, it should be understood that any other type of source and target machines can be applicable to the methodology disclosed herein.

Figure 4:
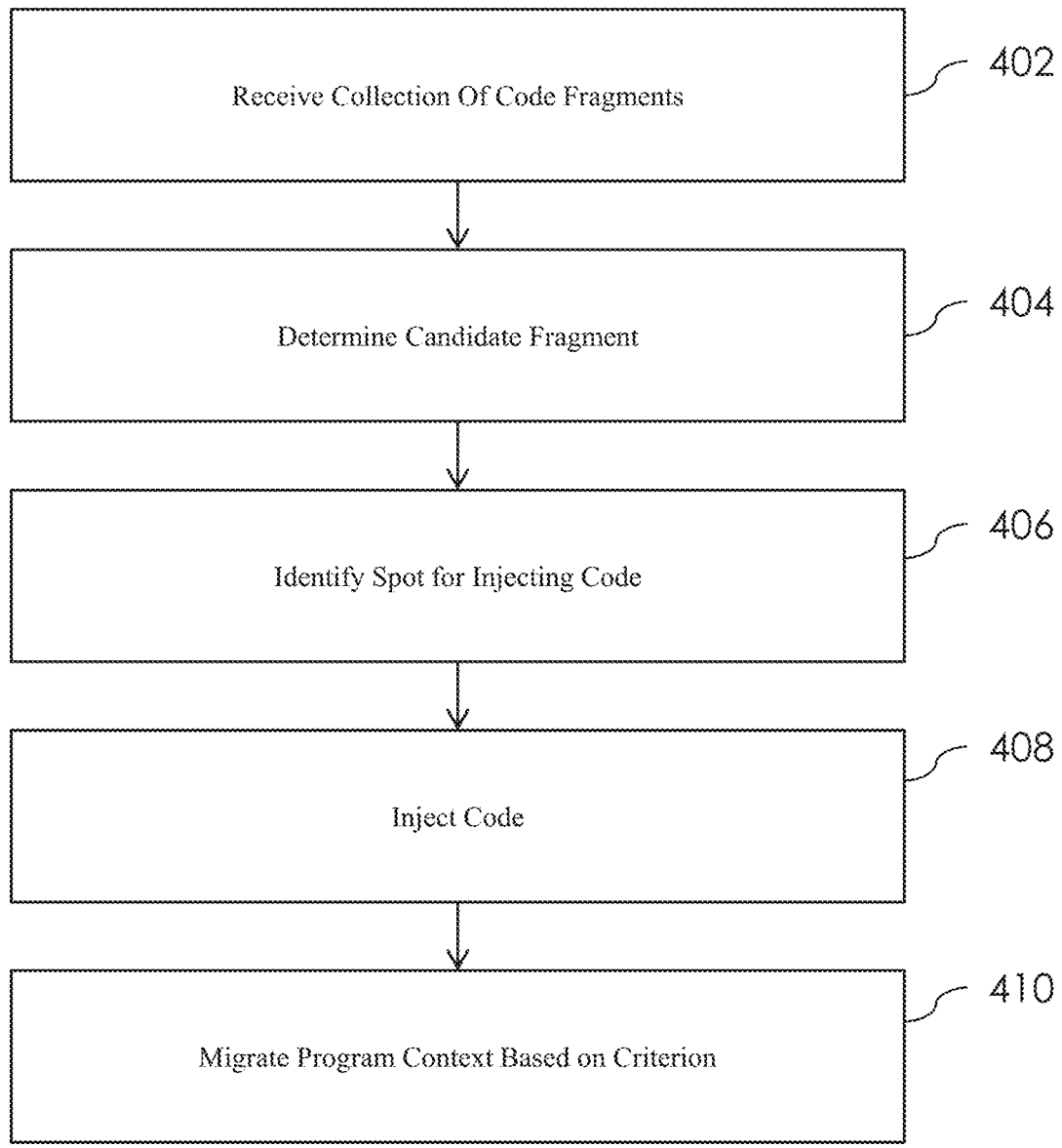
FIG. 4 is a flow diagram illustrating a method for program migration in an embodiment.

FIG. 4 is a flow diagram illustrating a method for program migration in an embodiment. The method can be implemented on or run by a computer processor. At 402, a collection of code fragments is received. For example, the code fragments can be loaded to an interactive development platform for running on a first processor. An example of the interactive development platform can be an interactive computing notebook.

At 404, a candidate fragment in the collection of code fragments is determined for migration to a second processor. In an embodiment, the second processor has more computational power or resources than the first processor. In an embodiment, such determination can be made based on characterizing the collection of code fragments. Characterizing the collection of code fragments can include determining computational intensiveness of each fragment in the collection of code fragments. In an embodiment, the computational intensiveness can be determined based on using previously known computational intensive code fragments. In an embodiment, the computational intensiveness can be determined based on training a machine learning model to predict a fragment's computational intensiveness based on the previously known computational intensive code fragments. In an embodiment, the computational intensiveness can be determined based on running time of a code fragment and interactive pattern associated with the code fragment.

At 406, based on a location of the candidate fragment in the collection of code fragments, a spot is identified in the collection of code fragments to inject a code for saving program context, for example, checkpointing.

At 408, the code is injected for saving program context in the identified spot. The identified spot can be in a fragment that is to be run immediately before the candidate fragment, for example, at the end of that fragment. This fragment can further be modified to present or display data or metadata about the fragment, e.g., the size of the program context, execution time of the fragment. In an embodiment, the candidate fragment can also be modified. For example, an interactive graphical element can be added to a user interface window of the interactive development platform, which shows the candidate fragment. The interactive graphical element can provide an option to a user to migrate the candidate fragment for running on the second processor. As another example, the candidate fragment can also be modified to present or display data or metadata associated with running the candidate fragment on a faster or more powerful processor, for example, savings or efficiency in computing.

At 410, responsive to the code for saving program context having run on the first processor and based on a criterion, migrating the program context to the second processor. The criterion can include comparing the size of the program context with a predefined or configurable threshold value. For instance, if the program context is large, it may not be efficient to transfer a large sized file to another machine. Another criterion can include the execution time or processing time for running the fragment that generated the program context. For instance, if the cost of transferring the program context to the second processor is less cost effective than running the fragment on the second processor and generating that program context on the second processor, than the fragment can be migrated instead of the program context. In an embodiment, the candidate fragment can also be migrated to the second processor, for example, if the second processor does not already have the fragment.

The method in an embodiment can also include receiving from the second processor an updated program context generated responsive to the candidate fragment running on the second processor. The method in an embodiment can also include continuing with running the collection of code fragments at the first processor.

Figure 5:
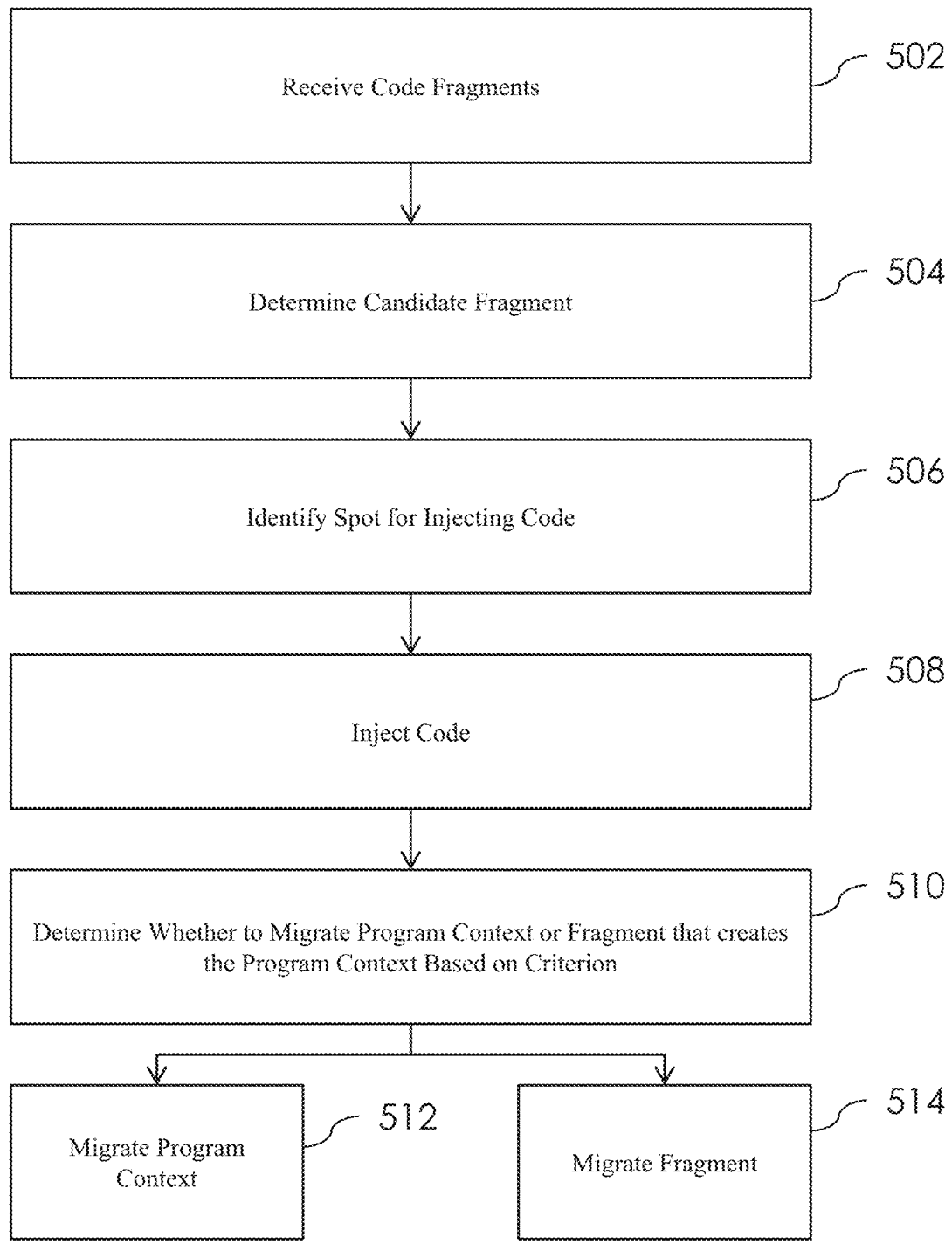
FIG. 5 is another flow diagram illustrating a method of program migration in an embodiment.

FIG. 5 is another flow diagram illustrating a method of program migration in an embodiment. The method can be implemented on or run by a computer processor. At 502, code fragments loaded in an interactive development platform are received for running on a first processor.

At 504, a candidate fragment is determined from the code fragments for migration to a second processor based on determining computational intensiveness associated with each of the code fragments. There can be multiple candidate fragments. In an embodiment, the computational intensiveness can be determined based on running time of a code fragment and interactive pattern associated with the code fragment.

At 506, a spot is identified in the code fragments for saving program context. There can be multiple spots. At 508, computer instructions for saving program context are injected in the identified spot. At 510, responsive to the computer instructions for saving program context having run on the first processor, the method can include determining whether migrating the program context or migrating code fragment that produced the program context is more cost effective. In an embodiment, whether migrating the program context or migrating code fragment that produced the program context is more cost effective can be determined based on the size of the program context and processing time for running the code fragment that produced the program context. For example, it may be more cost effective to run the code fragment that produced the program context on the second processor, rather than transfer the program context to the second processor.

At 512, responsive to determining that migrating the program context is more cost effective, the program context is migrated to the second processor. At 514, responsive to determining that migrating the code fragment that produced the program context is more cost effective, the code fragment that produced the program context is migrated to the second processor, so for example, that code fragment can be run on the second processor and the candidate processor can run on the second processor following that code fragment.

The method can also include waiting for second processor to run the candidate fragment and receiving an updated program context associated with running of the candidate fragment.

Figure 6:
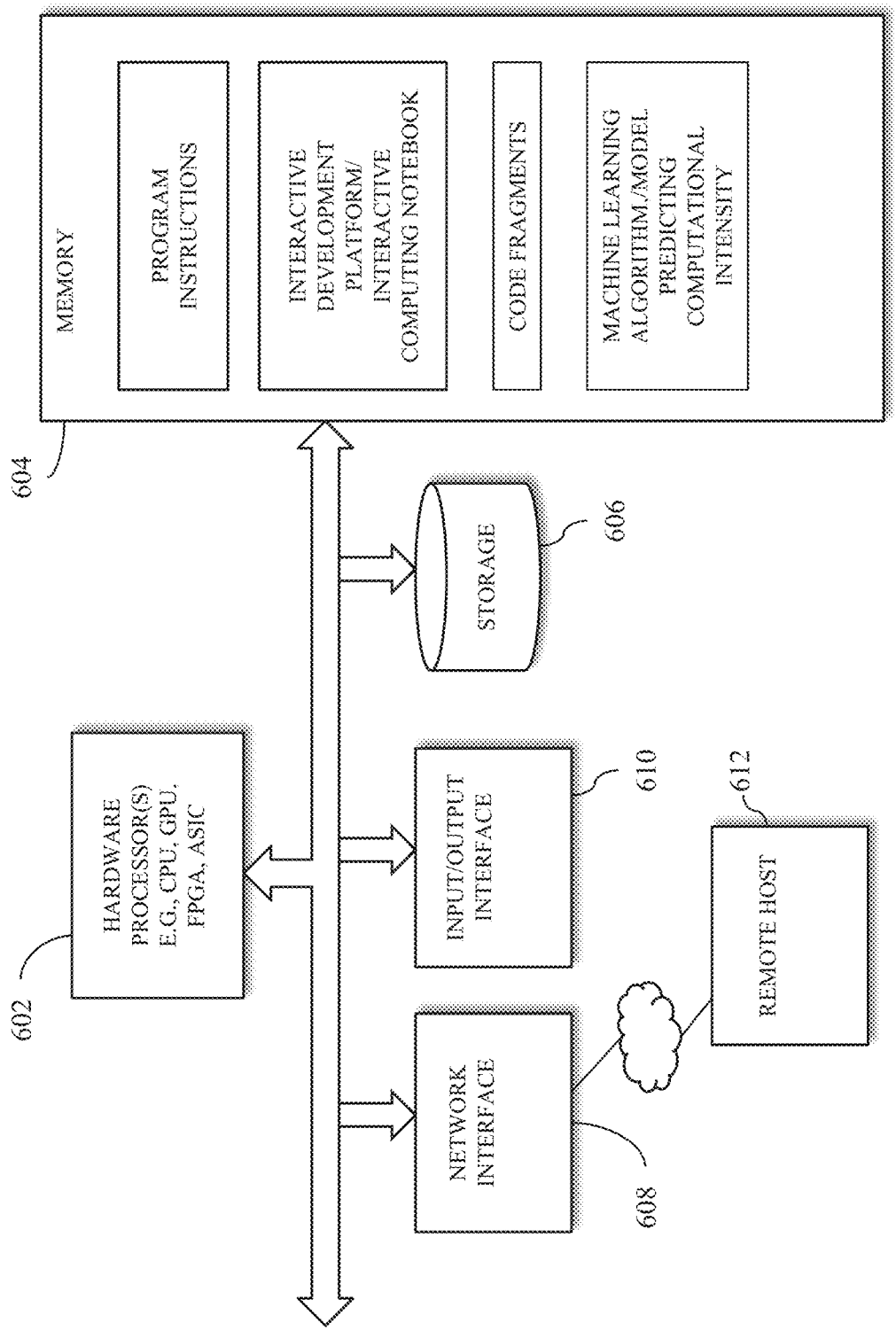
FIG. 6 is a diagram showing components of a system in one embodiment that can perform program migration.

FIG. 6 is a diagram showing components of a system in one embodiment that can perform program migration. One or more hardware processors 602 such as a central processing unit (CPU), a graphic process unit (GPU), and/or a Field Programmable Gate Array (FPGA), an application specific integrated circuit (ASIC), and/or another processor, may be coupled with a memory device 604, and perform program migration described herein. A memory device 604 may include random access memory (RAM), read-only memory (ROM) or another memory device, and may store data and/or processor instructions for implementing various functionalities associated with the methods and/or systems described herein. One or more processors 602 may execute computer instructions stored in memory 604 or received from another computer device or medium. A memory device 604 may, for example, store instructions and/or data for functioning of one or more hardware processors 602, and may include an operating system and other program of instructions and/or data. One or more hardware processors 602 may receive input including a collection of code fragments loaded in an interactive development platform, for example, interactive computing notebook. At least one hardware processor 602 may determine one or more candidate fragments for migration for running on a different or another processor, for example, GPU, FPGA, or on another processor on a different host machine, such as a remote host. The different or another processor, for example, has more computational power and can run the one or more candidate fragments faster than the current processor or machine. At least one hardware processor 602 may identify a spot or place in the collection of fragments to inject a code for saving program context. For instance, the spot or place can be immediately before a candidate fragment. At least one hardware processor 602 may inject the code for saving program context in the identified spot. Responsive to the code for saving program context having run on the first processor, and for example, based on a criterion, the program context may be migrated to the second processor. The second processor can be a GPU or FPGA or another device on the same machine. In another aspect, the second processor can be a processor of a remote host 612, for example, a supercomputer or another. In an aspect, the program context may be stored on a storage device 606 or on another storage device on a remote device connected via a network interface 608. The code fragments can be temporarily loaded onto a memory device 604, for example, for running by one or more hardware processors 602. One or more hardware processors 602 may be coupled with interface devices such as a network interface 608 for communicating with remote systems, for example, via a network, and an input/output interface 610 for communicating with input and/or output devices such as a keyboard, mouse, display, and/or others.

Figure 7:
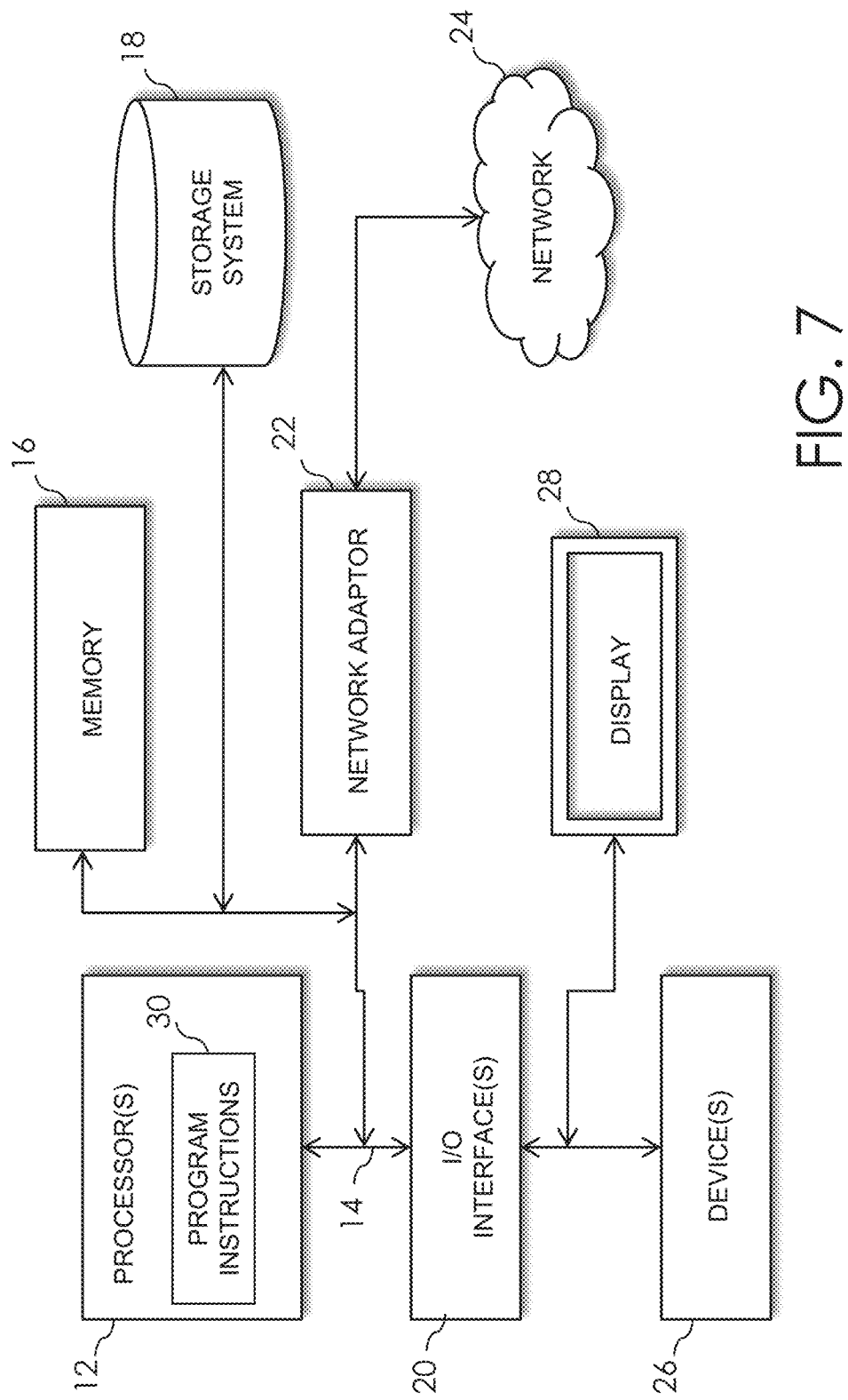
FIG. 7 illustrates a schematic of an example computer or processing system that may implement a system according to one embodiment.

FIG. 7 illustrates a schematic of an example computer or processing system that may implement a system in one embodiment. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 7 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being run by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
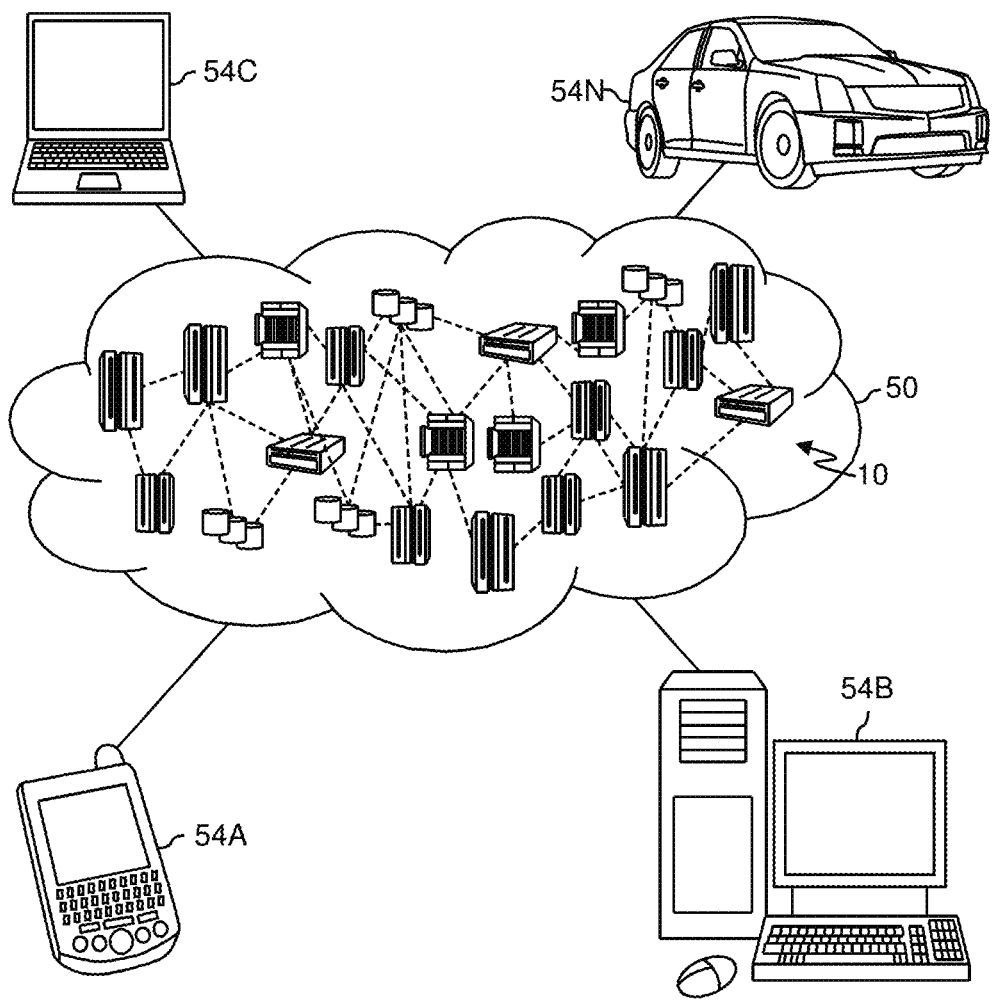
FIG. 8 illustrates a cloud computing environment in one embodiment.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
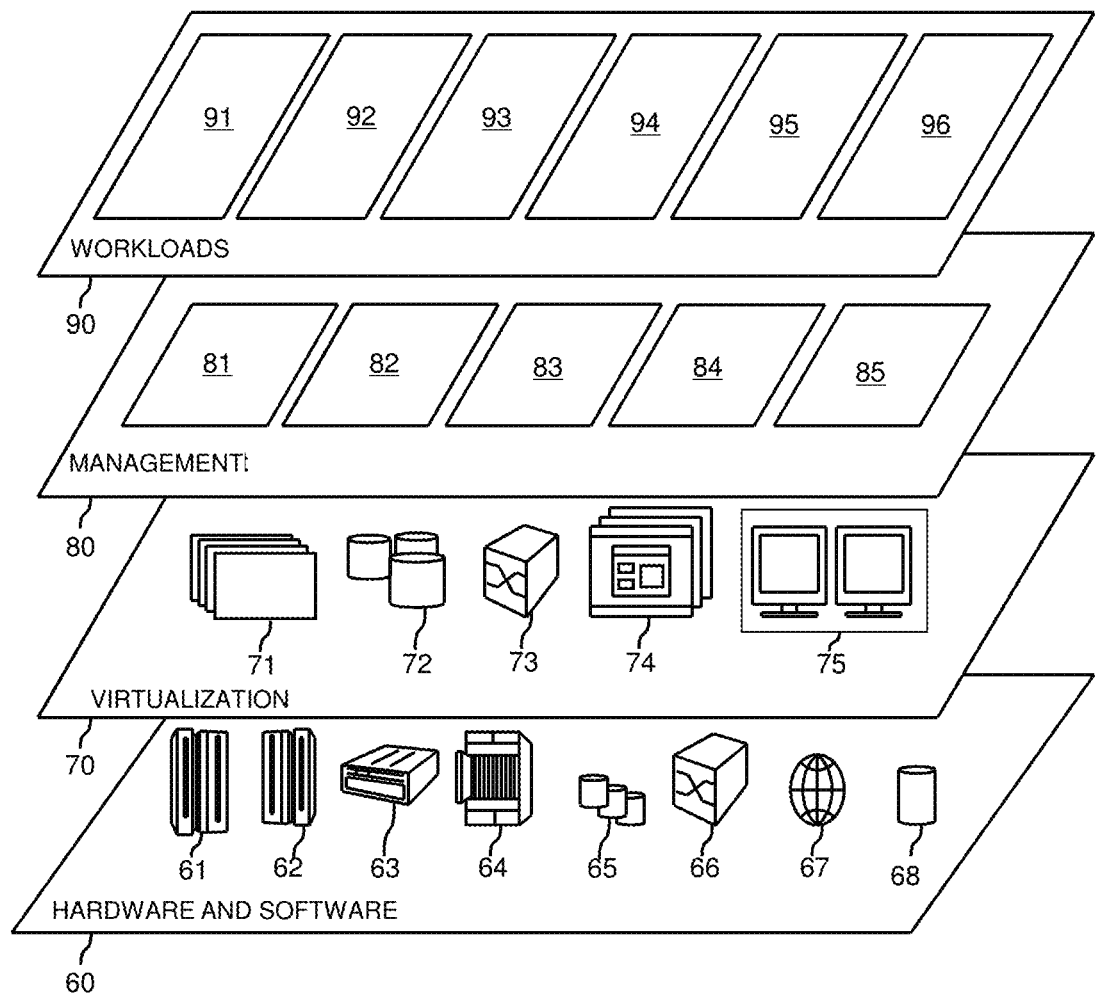
FIG. 9 illustrates a set of functional abstraction layers provided by cloud computing environment in one embodiment of the present disclosure.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and program migration processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, run concurrently, substantially concurrently, in a partially or wholly temporally overlapping manner, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in an embodiment" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
   receiving a collection of code fragments loaded in an interactive development platform for running on a first processor;
   determining a candidate fragment in the collection of code fragments for migration to a second processor based on automatically characterizing the collection of code fragments at least using a machine learning model trained with normalized code execution times of code documents;
   based on a location of the candidate fragment in the collection of code fragments, identifying a spot in the collection of code fragments to inject a code for saving program context;
   injecting the code for saving program context in the identified spot; and
   responsive to the code for saving program context having run on the first processor and based on a criterion, migrating the program context to the second processor.

2. The method of claim 1, further including migrating the candidate fragment to the second processor.

3. The method of claim 1, further including:
   receiving from the second processor an updated program context generated responsive to the candidate fragment running on the second processor; and
   continuing with running the collection of code fragments at the first processor.

4. The method of claim 1, wherein the interactive development platform includes an interactive computing notebook.

5. The method of claim 1, wherein characterizing the collection of code fragments includes determining computational intensiveness of each fragment in the collection of code fragments.

6. The method of claim 5, wherein the computational intensiveness is determined based on using previously known computational intensive code fragments.

7. The method of claim 6, wherein the computational intensiveness is determined based on training a machine learning model to predict a fragment's computational intensiveness based on the previously known computational intensive code fragments.

8. The method of claim 5, wherein the computational intensiveness is determined based on running time of a code fragment and interactive pattern associated with the code fragment.

9. The method of claim 1, further including adding an interactive graphical element to a user interface window of the interactive development platform showing the candidate fragment, the interactive graphical element providing an option to a user to migrate the candidate fragment for running on the second processor.

10. The method of claim 1, wherein the criterion includes a size of the program context meeting a threshold value.

11. The method of claim 1, wherein the second processor has more computational power than the first processor.

12. A computer-implemented method comprising:
receiving code fragments loaded in an interactive development platform for running on a first processor;
determining a candidate fragment from the code fragments for migration to a second processor based on determining computational intensiveness associated with each of the code fragments;
identifying a spot in the code fragments for saving program context;
injecting in the identified spot computer instructions for saving program context;
responsive to the computer instructions for saving program context having run on the first processor, determining whether migrating the program context or migrating code fragment that produced the program context is more cost effective, the code fragment having run prior to the candidate fragment so as to produce the program context considered for migration;
responsive to determining that migrating the program context is more cost effective, migrating the program context to the second processor; and
responsive to determining that migrating the code fragment that produced the program context is more cost effective, migrating the code fragment that produced the program context to the second processor without migrating the program context produced by the code fragment.

13. The method of claim 12, wherein whether migrating the program context or migrating code fragment that produced the program context is more cost effective is determined based on size of the program context and processing time for running the code fragment that produced the program context.

14. The method of claim 13, wherein a plurality of spots for saving program contexts in a plurality of code fragments are identified, and the method further includes choosing which checkpoints created at which of the plurality of spots are to be migrated based on program context sizes of the checkpoints and processing times of the code fragments that created the checkpoints.

15. The method of claim 12, wherein the computational intensiveness is determined based on running time of a code fragment and interactive pattern associated with the code fragment.

16. A computer program product comprising a computer readable storage medium having program instructions embodied therewith, the program instructions readable by a device to cause the device to:
receive a collection of code fragments loaded in an interactive development platform for running on a first processor;
determine a candidate fragment in the collection of code fragments for migration to a second processor based on automatically characterizing the collection of code fragments at least using a machine learning model trained with normalized code execution times of code documents;
based on a location of the candidate fragment in the collection of code fragments, identify a spot in the collection of code fragments to inject a code for saving program context;
inject the code for saving program context in the identified spot; and
responsive to the code for saving program context having run on the first processor and based on a criterion, migrate the program context to the second processor.

17. The computer program product of claim 16, wherein the device is further caused to migrate the candidate fragment to the second processor.

18. The computer program product of claim 16, wherein the device is further caused to receive from the second processor an updated program context generated responsive to the candidate fragment running on the second processor and continue with running the collection of code fragments at the first processor.

19. The computer program product of claim 16, wherein the interactive development platform includes an interactive computing notebook.

20. The computer program product of claim 16, wherein the device is caused to characterize the collection of code fragments by determining computational intensiveness of each fragment in the collection of code fragments.

21. The computer program product of claim 16, wherein the computational intensiveness is determined based on training a machine learning model to predict a fragment's computational intensiveness based on previously known computational intensive code fragments.

22. The computer program product of claim 20, wherein the computational intensiveness is determined based on running time of a code fragment and interactive pattern associated with the code fragment.

23. The computer program product of claim 16, wherein the device is further caused to add an interactive graphical element to a user interface window of the interactive development platform showing the candidate fragment, the interactive graphical element providing an option to a user to migrate the candidate fragment for running on the second processor.

24. A computer program product comprising a computer readable storage medium having program instructions embodied therewith, the program instructions readable by a device to cause the device to:
receive code fragments loaded in an interactive development platform for running on a first processor;
determine a candidate fragment from the code fragments for migration to a second processor based on determining computational intensiveness associated with each of the code fragments;
identify a spot in the code fragments for saving program context;
inject in the identified spot computer instructions for saving program context;
responsive to the computer instructions for saving program context having run on the first processor, determine whether migrating the program context or migrating code fragment that produced the program context is more cost effective, the code fragment having run prior to the candidate fragment so as to produce the program context considered for migration;
responsive to determining that migrating the program context is more cost effective, migrate the program context to the second processor; and
responsive to determining that migrating the code fragment that produced the program context is more cost effective, migrate the code fragment that produced the program context to the second processor without migrating the program context produced by the code fragment.

25. A system comprising:

a hardware processor; and a memory device coupled with the hardware processor;

the hardware processor configured to at least:

receive code fragments loaded in an interactive development platform for running on a first processor;

determine a candidate fragment from the code fragments for migration to a second processor based on determining computational intensiveness associated with each of the code fragments;

identify a spot in the code fragments for saving program context;

inject in the identified spot computer instructions for saving program context;

responsive to the computer instructions for saving program context having run on the first processor, determine whether migrating the program context or migrating code fragment that produced the program context is more cost effective, the code fragment having run prior to the candidate fragment so as to produce the program context considered for migration;

responsive to determining that migrating the program context is more cost effective, migrate the program context to the second processor; and responsive to determining that migrating the code fragment that produced the program context is more cost effective, migrate the code fragment that produced the program context to the second processor without migrating the program context produced by the code fragment.

\* \* \* \* \*